(12) United States Patent
Marini et al.

(10) Patent No.: US 10,198,488 B2
(45) Date of Patent: Feb. 5, 2019

(54) QUERYING A DATABASE WITH THICKNESS CRITERION

(71) Applicant: Dassault Systemes, Velizy Villacoublay (FR)

(72) Inventors: Laurent Marini, Paris (FR); Remy Rorato, Paris (FR); Jean-Francois Rameau, Lisses (FR)

(73) Assignee: Dassault Systemes, Velizy Villacoublay (FR)

( * ) Notice: Subject to any disclaimer, the term of this patent is extended or adjusted under 35 U.S.C. 154(b) by 248 days.

(21) Appl. No.: 15/161,861

(22) Filed: May 23, 2016

(65) Prior Publication Data

US 2016/0350387 A1    Dec. 1, 2016

(30) Foreign Application Priority Data

May 28, 2015 (EP) .................................... 15305809

(51) Int. Cl.
*G06F 17/30* (2006.01)
*G06F 17/50* (2006.01)

(52) U.S. Cl.
CPC .. *G06F 17/30554* (2013.01); *G06F 17/30386* (2013.01); *G06F 17/30525* (2013.01);
(Continued)

(58) Field of Classification Search
CPC ......... G06F 17/30386; G06F 17/30554; G06F 17/50; G06F 17/5086; G06F 2217/04; G06T 2207/10028; G06T 2210/12
See application file for complete search history.

(56) References Cited

U.S. PATENT DOCUMENTS 6,615,503 B1    9/2003    Nzomigni et al.
6,721,614 B2    4/2004    Duncan et al.
(Continued)

FOREIGN PATENT DOCUMENTS

CN    1647112    7/2005
CN    101059335    10/2007
(Continued)

OTHER PUBLICATIONS

3DPartFinder by 3DSemantix—Geometric search engine > Home; http://www.3dpartfinder.com, (2016).
(Continued)

*Primary Examiner* — Merilyn P Nguyen
(74) *Attorney, Agent, or Firm* — Hamilton, Brook, Smith & Reynolds, P.C.

(57) ABSTRACT

The invention notably relates to a computer-implemented method for querying a database that comprises 3D modeled objects that represent mechanical parts. The method comprises the steps of providing a query that includes a thickness criterion and returning, as results of the query, respective 3D modeled objects of the database based on an extent to which the respective 3D modeled object has a thickness that respects the thickness criterion. The thickness of the respective 3D modeled object is proxied by a thickness signature that corresponds to the evaluation of a function of the type $f(x)=$ $$a(b + cx^{\frac{3}{2}}).$$

Such a method improves the querying of a database that comprises 3D modeled objects that represent mechanical parts.

13 Claims, 7 Drawing Sheets

(52) U.S. Cl.
CPC .......... *G06F 17/50* (2013.01); *G06F 17/5086* (2013.01); *G06F 2217/04* (2013.01); *G06T 2207/10028* (2013.01); *G06T 2210/12* (2013.01)

(56) References Cited

U.S. PATENT DOCUMENTS

| | | | |
|---|---|---|---|
| 6,768,928 | B1 | 7/2004 | Nagasawa et al. |
| 6,778,970 | B2 | 8/2004 | Au |
| 7,027,054 | B1 | 4/2006 | Cheiky |
| 7,269,808 | B2 | 9/2007 | Bruce et al. |
| 7,688,318 | B2 | 3/2010 | O'Malley, III et al. |
| 7,733,340 | B1 | 6/2010 | Desimone et al. |
| 7,913,190 | B2* | 3/2011 | Grimaud .................. G06T 19/00 345/419 |
| 8,248,407 | B2* | 8/2012 | Deslandes ........... G06F 17/5086 345/420 |
| 8,812,272 | B2 | 8/2014 | Martin et al. |
| 9,449,430 | B2 | 9/2016 | Janvier |
| 9,798,835 | B2 | 10/2017 | Rorato |
| 9,881,388 | B2 | 1/2018 | Rorato et al. |
| 9,916,345 | B1* | 3/2018 | Makadia ........... G06F 17/30265 |
| 9,916,538 | B2* | 3/2018 | Zadeh ..................... G06K 9/627 |
| 2002/0008700 | A1 | 1/2002 | Fuki |
| 2002/0095276 | A1 | 7/2002 | Rong et al. |
| 2003/0191627 | A1 | 10/2003 | Au |
| 2007/0279414 | A1 | 12/2007 | Vandenbrande |
| 2008/0143714 | A1 | 6/2008 | Huang |
| 2009/0182450 | A1 | 7/2009 | Goldschmidt |
| 2011/0224813 | A1 | 9/2011 | Takatsuka |
| 2012/0078587 | A1 | 3/2012 | Martin et al. |
| 2012/0173212 | A1* | 7/2012 | Rameau .................. G06F 17/50 703/2 |
| 2014/0184594 | A1 | 7/2014 | Janvier |
| 2014/0188439 | A1 | 7/2014 | Rorato |
| 2014/0354636 | A1 | 12/2014 | Rorato et al. |
| 2016/0117792 | A1* | 4/2016 | Rolland-Neviere ........................ G06T 1/0064 382/100 |
| 2016/0350335 | A1 | 12/2016 | Rorato |
| 2016/0350387 | A1 | 12/2016 | Marini et al. |
| 2017/0371948 | A1 | 12/2017 | Rorato |
| 2018/0137118 | A1 | 5/2018 | Lieutier |

FOREIGN PATENT DOCUMENTS

| | | |
|---|---|---|
| CN | 101995231 | 3/2011 |
| EP | 0 646 884 A2 | 4/1995 |
| EP | 0 646 884 A3 | 4/1995 |
| EP | 0 964 364 A2 | 12/1999 |
| EP | 2 169 567 A2 | 3/2010 |
| EP | 2 387 004 A1 | 11/2011 |
| JP | 2001250130 | 9/2001 |
| WO | WO 2004/068300 A2 | 8/2004 |
| WO | WO 2008/094170 A1 | 8/2008 |
| WO | WO 2011/103031 A1 | 8/2011 |
| WO | WO 2015/085435 A1 | 12/2014 |

OTHER PUBLICATIONS

Altmeyer, J. et al., "Reuse of Design Objects in CAD Frameworks," IEEE/ACM International Conference on Computer-Aided Design, Digest of Technical Papers, pp. 754-761 (Nov. 6, 1994).
Babic, B., et al., "A Review of Automated Feature Recognition with Rule-Based Pattern Recognition," *Computers in Industry*, 59:321-337 (2008).
Beardsly, Jason, "Seamless Servers: The Case for and Against," *Massively MultiPlayer Game Development*, Section 3.1, 211-227.
Bespalov, D. et al., "Local Feature Extraction and Matching Partial Objects", *Computer Aided Design*, 38(9): 1020-1037 (2006).
Biasotti, S. et al., "Sub-part correspondence by structural descriptors of 3D shapes," *Computer-Aided Design*, 38(9): 1002-1019 (Sep. 2006).

Brière-Côté, Antoine et al. ,"Comparing 3D CAD Models: Uses, Methods, Tools and Perspectives," *Computer Aided Design & Applications*, 9(6): 771-794 (2012).
Clark, D.E.R. et al., "Benchmarking shape signatures against human perceptions of geometric similarity," *Computer-Aided Design*, 38(9): 1038-1051 (Sep. 2006).
Cornelio A. et al., "Integration and Cataloging of Engineering Design Information," *Systems Integration '90*, IEEE Comput., Soc., US, pp. 720-729 (Apr. 23, 1990).
Creo™ Parametric Data Sheet, © 2011 Parametric Technology Corporation, available at http://www.creo.uk.com/creo_parametric_mapping.htm, last accessed Mar. 27, 2014.
Daras, P., et al., "A 3D Shape Retrieval Framework Supporting Multimodal Queries", Int J Comput Vis 89: 229-247 (2010).
European Search Report completed May 13, 2013 for European Application No. EP 12306721.
European Search Report, European Application No. EP 10 30 6026, Date of Completion of Search: Feb. 3, 2011, 8 pages.
European Search Report, European Application No. EP 12 30 6720, dated Jul. 4, 2013.
European Search Report, European Application No. EP 13 30 5700, dated Aug. 14, 2013.
Falcidieno, B. and Giannini, F., "A System for Extracting and Representing Feature Information Driven by the Application Context", *Proceedings IEEE International Conference on Robotics and Automation*, pp. 1672-1678 (Jan. 1, 1990).
Fonseca, M.J. et al., "Towards content-based retrieval of technical drawings through high-dimensional indexing," *Computers and Graphics*, 27(1): 61-69 (Feb. 2003).
Funkhouser, T. et al., "Modeling by Example," *ACM Transactions on Graphics*, 23(3): 652-663 (Aug. 1, 2004).
Funkhouser, Thomas et al. ,"A Search Engine for 3D Models," *ACM Transactions on Graphics*, vol. V, No. N, 10 202002, 28 Pages.
Imoru, C.O. et al., "On a Version of the Banach's Fixed Point Theorem," *General Mathematics*, vol. 16, Nr. 1, pp. 25-32 (2008).
Ismail, N., et al., "Feature Recognition Patterns for Form Features Using Boundary Representation Models," *Int J Adv Manuf Technol*, 20:553-556 (2002).
Kao, C.-Y., et al., "Extraction of 3D Object Features from CAD Boundary Representation Using the Super Relation Graph Method," *IEEE Transactions on Pattern Analysis and Machine Intelligence*, 17(12):1228-1233 (1995).
Kazhdan, M. et al. "Harmonic 3D Shape Matching," ACM SIGGRAPH Symposium on Computer Animation, p. 191 (Jul. 21, 2002).
Kazhdan, Michael et al., "Rotation Invariant Spherical Harmonic Representation of 3D Shape Descriptors," *Eurographics Symposium on Geometry Processing*, 9 pages (2003).
Lee, K.S. et al., "Framework of an evolutionary design system incorporating design information and history," *Computers in Industry*, 44(3): pp. 205-227 (Apr. 2001).
Author: Lujie Ma, et al. Title: Automatic discovery of common design structures in CAD models; Publisher: Computer & Graphics 34 (2010) 545-555.
Maranzana, Roland, "3D Data Mining Part and Information Re-Use in a PLM Context," Proceedings of GT2007, May 14-17, 2013, Montreal, Canada, ASME Paper: GT2007-27966, American Society of Mechanical Engineers, New York, NY, 2007. http://dx.doi.org/10.1115/GT2007-27966, 37 pages (2013).
Munkres, James, R., "Elements of algebraic topology", Addison-Wesley Publishing Company, Inc. (1984).
Papadakis, P. et al, "Efficient 3D shape matching and retrieval using a concrete radialized spherical projection representation," *ScienceDirect*, 40: 2437-2452 (2007).
Pauly, M., et al., "Discovering Structural Regularity in 3D Geometry," *ACM Transactions on Graphics*, 27(3):43:1-43:11 (2008).
Petre, R.D., "An experimental evaluation of view-based 2D/3D indexing methods", 2010 IEEE 26th Convention of Electrical and Electronics Engineers in Israel, Nov. 2010, Israel. pp. 924-928.
Santa-Cruz, D. and Ebrahimi, T., "Compression of Parametric Surfaces for Efficient 3D Model Coding," *VCIP*, 4671:280-291 (2002).

(56) References Cited

OTHER PUBLICATIONS

Shih, R., *Parametric Modeling with Creo™ Parametric: An Introduction to Creo™ Parametric 1.0*, SDC Publications © 2011 (table of contents only).
Shikhare, D., et al. "Compression of Large 3D Engineering Models Using Automatic Discovery of Repeating Geometric Features," *National Centre for Software Technology*, 233-240 (2001).
Wang, D., et al., "EQSM: An Efficient High Quality Surface Grid Generation Method Based on Remeshing," *Comput. Methods Appl. Mech. Engrg.*, 195:5621-5633 (2006).
Werghi, N., "Extracting Ordered Patterns from a Triangular Mesh Surface," *IEEE Potentials*, 34-43 (2011).
Yang, M., et al., "A Survey of Shape Feature Extraction Techniques". Peng-Yeng Yin. Pattern Recognition, IN-TECH, pp. 43-90 (2008).
Boltcheve, D., "An Iterative Algorithm for Homology Computation on Simplical Shapes", Computer Aided Design, vol. 43, No. 11, pp. 1457-1467 Sep. 2, 2011.
Cardone, A., et al. "A Survey of Shape Similarity Assessment Algorithms for Product Design and Manufacturing Applications", Journal of Computing and Information Science in Engineering, vol. 3 No. 2, pp. 109-118, Jan. 1, 2003.
European Search Report for EP 16 17 6763 dated Dec. 1, 2016.
European Search Report for EP 16 30 6488 dated May 23, 2017.
Frosini, P., et al. "Combining Persistent Homology and Invariance Groups for Shape Comparison", Discrete & Computational Geometry, vol. 55, No. 2, pp. 373-409, Feb. 2, 2016.
Oudot, S., Topological Signatures:, Presentation given in Springs School in LA Marsa, pp. 1-86, Apr. 2016.
Tangelder, J., et al., "A Survey of Content Based 3D Shape Retrieval Methods", Multimedia Tools and Applications, Kluwer Academic Publishers, vol. 39, No. 3, pp. 441-471; Dec. 8, 2007.
Wagner, et al. "Modeling Software with Finite State Machines" Auerbach Publications, 2006.
Working with Pattern Recognition; http://learningexchange.ptc.com/tutorial/519/working-with-pattern-recognition (2014).
Chiang, L., et al. "Identification of Patterns of Repeated Parts in Solid Objects", IMATI Report Series, pp. i-111, Nov. 2, 2016.
Dang, Q.V., et al., "Similarity Detection for Free-Form Parametric Models", 21st International Conference on Computer Graphics, Visualization and Computer Vision, pp. 239-248 (2013).
European Search Report for EP 16 30 6790 dated Jun. 7, 2017, 3 pages.
Gordon, L., "Comparing 3D CAD Modelers—What Designers should know about history-based and dynamic schemes", Machine Design, pp. 1-4, Nov. 22, 2006.

* cited by examiner

QUERYING A DATABASE WITH THICKNESS CRITERION

RELATED APPLICATION(S)

This application claims priority under 35 U.S.C. § 119 or 365 to Europe, Application No. 15305809.4, filed May 28, 2015. The entire teachings of the above application(s) are incorporated herein by reference.

FIELD OF THE INVENTION

The invention relates to the field of computer programs and systems, and more specifically to a method, system and program for querying a database that comprises 3D modeled objects that represent mechanical parts.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

In this context, there is a need to search existing mechanical parts in a database according to a user-defined criterion, notably where parts are modeled by solids. Searching parts in a database according to a predefined criterion is generally performed through three steps. The first step is to compute and associate to each solid of the database a so-called "signature" (or "descriptor"). A signature is a compact information that synthetizes a typical aspect of the part. The second step if for the user to specify a request/query by setting a signature, and the goal is to find parts that match this signature in the database. Similarly, the signature in the query can be the one of a part being designed and the goal is, again, to find similar parts on the database. The third step is the searching step. It amounts for the system to find parts of the database the signatures of which correspond to the user-input signature. Signatures are massively compared during this step. The signature is advantageously designed to require a small amount of memory, to be easy to compute and to be very rapid to compare.

Existing signatures for shape description may often be based on spherical functions. For specialized domains such as mold design, a dedicated signature may involve material, process, and geographical information. For precise solid comparison, the signature may sometimes include geometrical information closely related to the boundary description of the solids. The following is a list of known solutions that allow querying a database of mechanical parts with such criteria:

1. Document EP 2169567 A2;
2. *Rotation Invariant Spherical Harmonic Representation of 3D Shape Descriptors*. M. Kazhdan, T. Funkhouser, and S. Rusinkiewicz, Eurographics Symposium on Geometry Processing (2003); and
3. *A search engine for 3D models*. T. Funkhouser, P. Min, M. Kazhdan, J. Chen, A. Halderman, D. Dobkin, D. Jacobs, D.: ACM Transactions on Graphics 22(1), 83-105 (2003).
4. *Efficient 3D shape matching and retrieval using a concrete radicalized spherical projection representation*, P. Papadakis, I. Pratikakis, S. Perantonis, T. Theoharis, Pattern Recognition 40 (2007) 2437-2452
5. *Comparing 3D CAD Models: Uses, Methods, Tools and Perspectives*, Antoine Brière-Côté, Louis Rivest and Roland Maranzana, Computer-Aided Design & Applications, 9(6), 2012, 771-794; and
6. Msaaf, O., Maranzana, R.; Rivest, L.: *Part data mining for information re-use in a PLM context*, Proceedings of GT2007, May 14-17, Montreal, Canada, ASME Paper: GT2007-27966, American Society of Mechanical Engineers, New York, N.Y., 2007.

Despite the existing literature, there is still a need for improving the field of searching mechanical parts in a database.

SUMMARY OF THE INVENTION

It is therefore provided a computer-implemented method for querying a database that comprises 3D modeled objects that represent mechanical parts. The method comprises the steps of providing a query that includes a thickness criterion; and returning, as results of the query, respective 3D modeled objects of the database. A respective 3D modeled object is returned based on an extent to which the respective 3D modeled object has a thickness that respects the thickness criterion. The thickness of the respective 3D modeled object is proxied by a thickness signature of the respective 3D modeled object. The thickness signature is a value that corresponds to the evaluation of a function of the type $$f(x) = a(b + cx^{\frac{3}{2}}).$$

b is the volume V of the respective 3D modeled object. a=2/S where S is the surface of the 3D modeled object.

$$c = (L_2 + L_3)\sqrt{\frac{V}{L_2 L_3}}.$$

L2 and L3 are the two largest dimensions of a bounding box associated to the respective 3D modeled object.

The method may comprise one or more of the following: the thickness signature corresponds to the last result of an iteration of the evaluation of function $f$, the evaluation at a given iteration being performed on the result of the previous iteration, starting from $f(0)$;

the iteration is stopped after the first iteration when the function has no fixed point, and/or the iteration is performed until a first fixed point is reached;

the bounding box has axes defined by the inertia matrix of the respective 3D modeled object;

the mechanical parts include mechanical thin parts; and/or the mechanical parts include any or several of the following parts: aerospace structural parts, such as clips, cleats, stringers and/or frames, sheet metal parts and/or metal stamping parts, such as automobile body-in-white parts or ship parts, plastic molding parts; and/or composite parts.

It is further provided a database to be queried according to this method. The database comprises 3D modeled objects that represent mechanical parts. Each respective 3D modeled object of the database is associated to a thickness signature of the respective 3D modeled object, the thickness signature of a respective 3D modeled object is a value that corresponds to the evaluation of a function of the type $$f(x) = a(b + cx^{\frac{3}{2}}).$$

b is the volume V of the respective 3D modeled object. a=2/S where S is the surface of the 3D modeled object.

$$c = (L_2 + L_3)\sqrt{\frac{V}{L_2 L_3}}.$$

L2 and L3 are the two largest dimensions of a bounding box associated to the respective 3D modeled object.

It is further provided a computer readable storage medium having recorded thereon the database.

It is further provided a computer-implemented method for constructing a database according to claim 7, wherein the method comprises, for each 3D modeled object, at least one evaluation of function $f$. Such method may comprise, for each 3D modeled object, an iteration of the evaluation of function $f$, the evaluation at a given iteration being performed on the result of the previous iteration, starting from $f(0)$. Also, the iteration may be stopped after the first iteration when the function has no fixed point, and/or the iteration is performed until a first fixed point is reached.

It is further provided a computer program comprising instructions for performing any of or both the two above methods.

It is further provided a computer readable storage medium having recorded thereon the computer program.

It is further provided a system comprising a processor coupled to a memory and a graphical user interface, the memory having recorded thereon the computer program and/or the above database.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

Embodiments of the invention will now be described, by way of non-limiting example, and in reference to the accompanying drawings, where.

DETAILED DESCRIPTION OF THE INVENTION

A description of example embodiments of the invention follows.

The teachings of all patents, published applications and references cited herein are incorporated by reference in their entirety.

Figure 1:
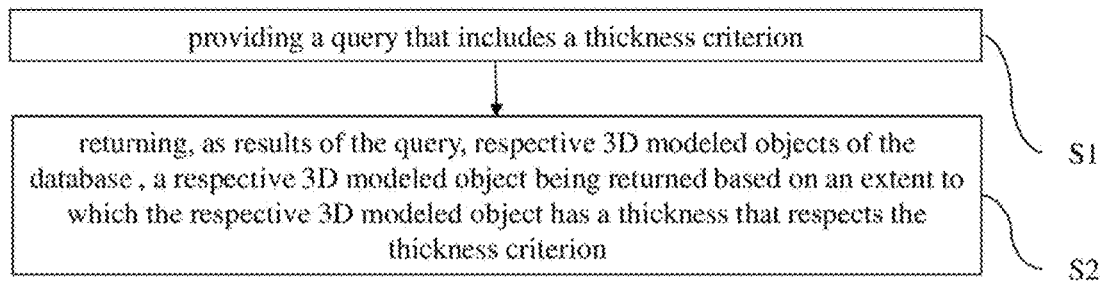
FIG. 1 shows a flowchart of an example of the method.

With reference to the flowchart of FIG. 1, it is proposed a computer-implemented method for querying a database that comprises (e.g. data of) 3D modeled objects that represent mechanical parts (i.e. each 3D modeled object of the database represents a respective mechanical part—at least its outer shape—, e.g. the term "mechanical part" also referring to an assembly thereof and/or to a portion thereof). The method comprises the step of providing S1 (e.g. to a database or to a plug-in/script running on such a database, e.g. at a client computer system or to a server computer system—i.e. database host—, e.g. the client possibly being confounded with the server, which may be the case if they are hosted by the same machine for example) a query that includes a thickness criterion (as part of the data that define the query, and e.g. at least as one of the possibly several criteria making the query, e.g. the query possibly including other criteria and optionally weights assigned to the different criteria, as very classical in the field of database search). The method also comprises the step of returning S2 (e.g. to the client or at the server), as results of the query (i.e. the returned data including one or more such results or even no/null result—which means that not necessarily several results are returned, the plural form being used as it is the generic expression—, depending on the query and/or on the content of the searched data), respective 3D modeled objects of the database. A respective 3D modeled object is returned based on an extent to which the value of the respective 3D modeled object has a thickness that respects the thickness criterion.

In S2, the (real) thickness of the respective 3D modeled object is proxied by (i.e. the value of the real thickness is replaced, in all steps of the method, by another value called "proxy" by definition and which is) a thickness signature of the respective 3D modeled object (i.e. the value of thickness considered in the process—calculations/comparisons/determinations—is not the real thickness, but a proxy thereof, called "thickness signature" and defined as following). The thickness signature is specifically a value that corresponds to the evaluation of a function of the type $$f(x) = a(b + cx^{\frac{3}{2}}).$$

b is the volume (noted V in the following examples) of the respective 3D modeled object. a is equal to $$\frac{2}{S},$$

where S is the surface or me 3D modeled object (i.e. outer surface area).

And $$c = (L_2 + L_3)\sqrt{\frac{V}{L_2 L_3}},$$

where $L_2$ and $L_3$ are the two largest dimensions of a bounding box associated to the respective 3D modeled object.

Such a method improves the querying of a database that comprises 3D modeled objects that represent mechanical parts.

Notably, the method provides a solution to perform a search based on the thickness in a database thanks to its steps S1 and S2 and to the definition of a thickness signature, proxy of the (real) thickness of a respective 3D modeled object. This is particularly useful in the field of mechanical design, where actors—notably designers who would like to retrieve previously designed parts in order to reuse them—often think of mechanical parts in terms of their thickness (among others). Thanks to the specific definition of the thickness signature, the method ensures the returning at S2 of relatively relevant results. Here, the "relevance" is such that the real thickness of a result 3D modeled object may equate an input thickness with an error of a predetermined maximum value, for example 20% or even 10% (at least statistically). Furthermore, the thickness signature of the method is very fast to calculate and small to store (in terms of memory required) thanks to its simplicity. This goes with a fast and simple comparison program, which makes the method very efficient in a context of massive computing where data access is critical. The method provides a robust, simple and rapid way to compute a thickness signature. Thus, signature computation as well as searching is made faster, and the signature can be computed for any shape of solid. Furthermore, the formula is easy to implement and the software is easy to maintain.

Relative to shape descriptors based on radial, spherical and/or geometrical information (to which it may be combined), the method allows a search based on thickness information. Also, the method takes into account the fact that a thin solid does not feature the same thickness everywhere, and proceeds in a way that is similar to defining some "average thickness" (rather than attaching thickness information everywhere on a solid and thereby implementing a costly algorithm e.g. that makes intensive use of line/solid intersections, such as ray casting, which, for performance purpose, could not be implemented to compute thicknesses of all solids of the database). In examples, the method can run efficiently on a database that contains more than a hundred 3D modeled objects, or more than a thousand, or even more than ten thousand.

The method is computer-implemented. This means that the steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. For example, S1 may involve user-interaction as the query might be provided through the user designing the input 3D modeled object and/or calling for and parameterizing a search/query software functionality. The level of user-computer interaction required may depend on the level of automatism foreseen and put in balance with the need to implement user's wishes. In examples, this level may be user-defined and/or pre-defined.

A typical example of computer-implementation of the method is to perform the method with a system adapted for this purpose. The system may comprise a processor coupled to a memory and a graphical user interface (GUI), the memory having recorded thereon a computer program comprising instructions for performing the method. The memory may also store a database, e.g. on which the query is executed. The memory is any hardware adapted for such storage, possibly comprising several physical distinct parts (e.g. one for the program, and possibly one for the database). The system may thus be a client-server system, or a mere client system (the database being stored on a remote server, the method of FIG. 1 being thereby seen from the point of view of the client in such a case) or a mere server system (the query stemming from a remote client system, the method of FIG. 1 being thereby seen from the point of view of the server in such a case). It is noted that the method of FIG. 1 may be indifferently seen as implemented from the client point of view and/or from the server point of view, as both communicate to perform the method. The returning S2 can indeed be active (database), or passive (client requesting the query).

By "database", it is meant any collection of data (i.e. information) organized for search and retrieval (e.g. a relational database, e.g. based on a predetermined structured language, e.g. SQL). When stored on a memory, the database allows a rapid search and retrieval by a computer. Databases are indeed structured to facilitate storage, retrieval, modification, and deletion of data in conjunction with various data-processing operations. The database may consist of a file or set of files that can be broken down into records, each of which consists of one or more fields. Fields are the basic units of data storage. Users may retrieve data primarily through queries. Using keywords and sorting commands, users can rapidly search, rearrange, group, and select the field in many records to retrieve or create reports on particular aggregates of data according to the rules of the database management system being used.

In the case of the method, the database comprises 3D modeled objects that represent mechanical parts. Each respective 3D modeled object of the database is furthermore associated (e.g. in a row or any other type of relation, depending on the database technology at use) to the value of the thickness signature of said respective object, the value of the thickness signature being as defined earlier (and it may be defined as a value of a field of the database or covering several fields, this being an implementation detail pertaining to database optimization and not further discussed here). Such a database can be built and/or incremented with new 3D modeled object(s) in order for example to be used in the querying method of FIG. 1 (if the database is appropriately configured). The database can thus be constructed in any way and it can be stored on the memory of the system as mentioned above, or on any other medium adapted for that. Such a database allows retrieving 3D modeled objects according to the method of FIG. 1, and it is thus a tool that may for example accelerate CAD design (by helping the designer retrieve relevant results and re-use them instead of re-designing everything from scratch, e.g. if the system is provided with such a re-use functionality).

The method generally manipulates modeled objects. A modeled object is any object defined by data stored e.g. in the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

Any 3D modeled object contemplated by the method may represent the geometry of a product to be manufactured in the real world subsequent to the completion of its virtual design with for instance a CAD software solution or CAD system, such as a (e.g. mechanical) part or assembly of parts. A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled objects contemplated by the method may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electromechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), and/or a packaging (including e.g. food and beverage and tobacco, beauty and personal care, household product packaging). Additional examples for which the thickness criterion is a particularly useful one to perform a database query are provided alter.

By PLM system, it is meant any system adapted for the management of a modeled object representing a physical manufactured product (or product to be manufactured). In a PLM system, a modeled object is thus defined by data suitable for the manufacturing of a physical object. These may typically be dimension values and/or tolerance values. For a correct manufacturing of an object, it is indeed better to have such values.

By CAM solution, it is additionally meant any solution, software of hardware, adapted for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus allowing decision on management or required investment. CAM is a subsequent process after a CAD process and potential CAE process. Such CAM solutions are provided by Dassault Systèmes under the trademark DELMIA®.

By CAE solution, it is additionally meant any solution, software of hardware, adapted for the analysis of the physical behavior of modeled object. A well-known and widely used CAE technique is the Finite Element Method (FEM) which typically involves a division of a modeled objet into elements which physical behaviors can be computed and simulated through equations. Such CAE solutions are provided by Dassault Systèmes under the trademark SIMULIA®. Another growing CAE technique involves the modeling and analysis of complex systems composed a plurality components from different fields of physics without CAD geometry data. CAE solutions allows the simulation and thus the optimization, the improvement and the validation of products to manufacture. Such CAE solutions are provided by Dassault Systèmes under the trademark DYMOLA®.

PDM stands for Product Data Management. By PDM solution, it is meant any solution, software of hardware, adapted for managing all types of data related to a particular product. A PDM solution may be used by all actors involved in the lifecycle of a product: primarily engineers but also including project managers, finance people, sales people and buyers. A PDM solution is generally based on a product-oriented database. It allows the actors to share consistent data on their products and therefore prevents actors from using divergent data. Such PDM solutions are provided by Dassault Systèmes under the trademark ENOVIA®.

Figure 2:
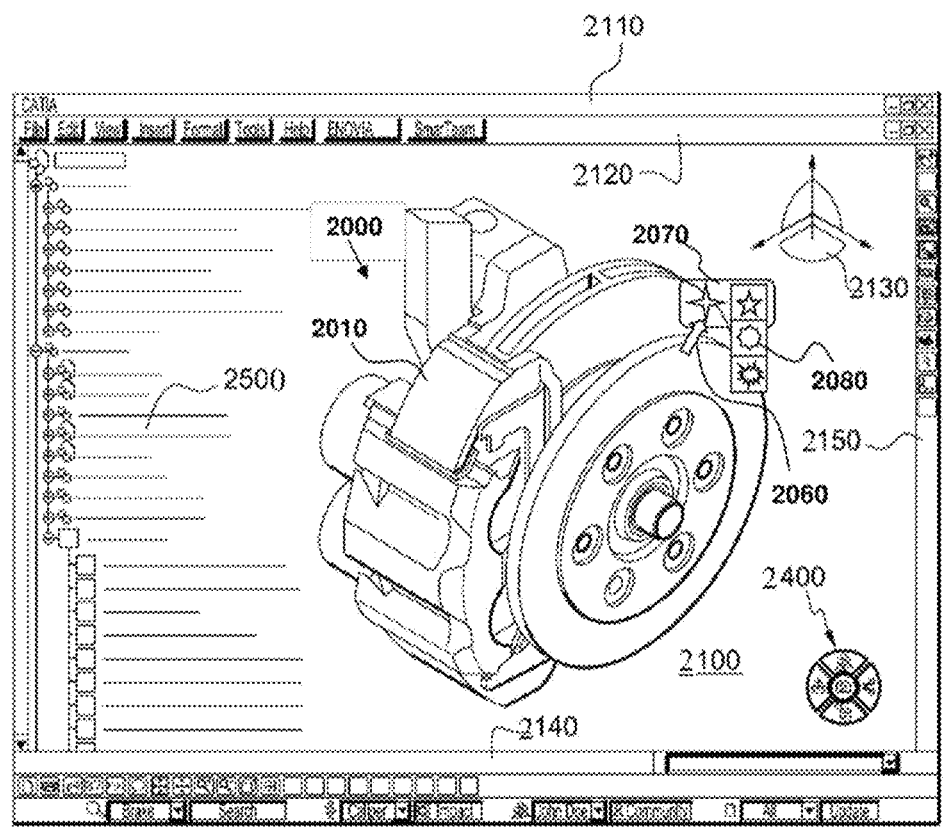
FIG. 2 shows an example of a graphical user interface of the system.

FIG. 2 shows an example of the GUI of the (client) system for performing the method, wherein the system is a CAD system.

The GUI 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art, e.g. one such operation/function being for launching the method of FIG. 1 (e.g. based on input modeled object 2000, or e.g. leading to display of resulting modeled object 2000, e.g. after selection among other results). Some of these icons are associated with software tools, adapted for editing and/or working on the 3D modeled object 2000 displayed in the GUI 2100. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. change the dimension, color, etc.) or edit geometrical constraints by selecting an appropriate icon. For example, typical CAD operations are the modeling of the punching or the folding of the 3D modeled object displayed on the screen. The GUI may for example display data 2500 related to the displayed product 2000. In the example of FIG. 2, the data 2500, displayed as a "feature tree", and their 3D representation 2000 pertain to a brake assembly including brake caliper and disc. The GUI may further show various types of graphic tools 2130, 2070, 2080, 2400 for example for facilitating 3D orientation of the object, for triggering a simulation of an operation of an edited product or render various attributes of the displayed product 2000. A cursor 2060 may be controlled by a haptic device to allow the user to interact with the graphic tools.

Figure 3:
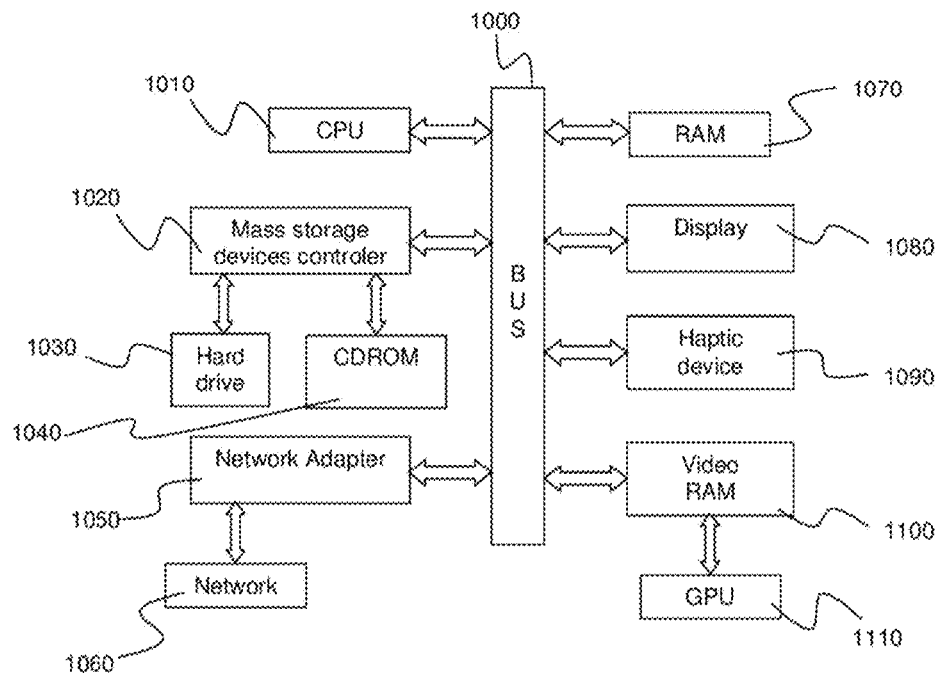
FIG. 3 shows an example of the system.

FIG. 3 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen. The server system (possibly confounded with the client system as mentioned earlier), may be similar to the one of FIG. 3 having in addition a database for running the query and connected to BUS 1000 or located on hard drive 1030, and possibly without video RAM 1100 and GPU 1110 and/or display 1080 and/or haptic device 1090.

A computer program may comprise instructions executable by a computer, the instructions comprising means for causing the above system to perform the method of FIG. 1 and/or for constructing the database. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The method may be part of a process of designing a 3D modeled object or it may follow such process. "Designing a 3D modeled object" designates any action or series of actions which is at least part of a process of elaborating a 3D modeled object. Thus, the method may comprise creating a first 3D modeled object from scratch (by the user), e.g. via a sketching-like process. Then the method may comprise running (on user command e.g. based on a user-input of the thickness criterion or as an—automatic—background process e.g. based on the thickness signature of the object being designed) a query according to FIG. 1. Alternatively, the thickness criterion is directly provided as a value by the user. Then the method may comprise optionally displaying the results to the user and selecting (by the user) a preferred result (if case there is at least one result). Finally the user may continue the design by modifying a result of the query (e.g. the one which has been selected), or by adding a result of the query to the current design. This can thus be useful to help a designer not unnecessarily re-design a model previously designed and re-use such previous design instead. Any other reason to perform a query according to FIG. 1 may however be contemplated. For example, the method may be used to find and e.g. delete duplicate (or almost duplicate, that is, very similar) 3D modeled objects from a database (for example in order to reduce the size of the database by eliminating redundancy), or group parts in a same thickness category or based on thickness similarity.

The method may be included in a manufacturing process, which may comprise, after performing the method, producing a physical product corresponding to the modeled object. In any case, the modeled object designed by the method may represent a manufacturing object. The modeled object may thus be a modeled solid (i.e. a modeled object that represents a solid). The manufacturing object may be a product, such as a part, or an assembly of parts. Because the method improves the design of the modeled object, the method also improves the manufacturing of a product and thus increases productivity of the manufacturing process.

The method of FIG. 1 is now discussed in more details.

The method is for querying a database that comprises 3D modeled objects that represent mechanical parts. Querying a database means that a query is run on the database according to the classical meaning of such expression in database engineering, which is that information from the database is extracted from the database as the result of the query (possibly null). In the case of the method, 3D modeled objects of the database (that is, any characterizing data thereof) are returned, possibly for user-selection and/or user-triggering of additional data to be downloaded. This is all known per se in the field of database engineering, and notably in its application to 3D similarity search.

As known, the query may be performed according to any type of criterion or any types of criteria. Results are then provided (one, several, or null) based on the extent to which pieces of data in the database respect the criterion/criteria, which is very classical. In the case of the method, the query includes at least a so-called thickness criterion (possibly said thickness criterion only), in other words a criterion related to the thickness. That means by definition that an extent to which potential results (at this point, data pieces of the database) match this criterion (the question of handling several criteria, for example with weights in the query, being left aside as this is an implementation detail that can be classically addressed) is evaluated to assess whether or not a piece of information is to be considered as a result or not. How exactly this extent may be evaluated is a matter of implementation. This extent may be binary (a 3D modeled object's thickness value respects the likeness criterion or not), or it can be progressive (strictly more than two levels of respect, possibly a continuum from a minimal—e.g. zero—value to a maximum value, e.g. 1—e.g. corresponding for example to two equal thickness values when the criterion is that results have a thickness equal to the input value). Also, how exactly it is decided that a respective 3D modeled object is a result to be returned or not based on said extent evaluated for said respective 3D modeled object is a matter of implementation too.

In examples, the method may return only a predetermined number of the most relevant results (e.g. 3D modeled objects "respecting" the thickness criterion more than the others), or only one (e.g. the "most respecting" one). In an example, the extent to which the likeness criterion is respected is a binary value and, in that example, the method may return all "respecting" 3D modeled objects—which does imply that all results are displayed to the user, at least at once, e.g. a scrolling action from the user possibly being required for that). In examples, the thickness criterion is provided as a range to be respected. Also, the criterion may grasp any "non-Boolean" criterion, such as "the ten best results".

Now, the returning S2 is based on a proxy of the (real) thickness of a 3D modeled object. The real thickness is a physical dimension related to the mechanical part represented by a respective 3D modeled object, said physical dimension relating to length measures of the mechanical part. The real thickness may be a distance map (e.g. providing a thickness distance value of the object at all 3D positions) or an average thereof (i.e. a single distance value), corresponding to the intuitive thickness definition. A formal definition is provided later. Here, it is simply noted that the real thickness is in any case relatively costly to compute. The method thereby achieves efficiency by using an adequate proxy (at least for the field of mechanical part design).

The proxy (called "thickness signature") is by definition a value that corresponds to the evaluation of a function provided by the following formula:

$$f(x) = a(b + cx^{\frac{3}{2}}).$$

b=V is the volume of the respective 3D modeled object (i.e. solid volume defined by the 3D modeled object—e.g. the 3D modeled object being provided as a closed skin—, which can be provided as such in the database or retrievable from other data, e.g. as an exact value or as a proxy value itself, any way of proceeding reasonably—e.g. error with exact volume inferior to 10%, or even 5%—being contemplated). a is equal to $$\frac{2}{S},$$

where S is the surface of the 3D modeled object (i.e. outer surface area—e.g. the 3D modeled object being provided as a closed skin—, which can be provided as such in the database or retrievable from other data, e.g. as an exact value or as a proxy value itself, any way of proceeding reasonably—e.g. error with exact area inferior to 10%, or even 5%—being contemplated). And $$c = (L_2 + L_3)\sqrt{\frac{V}{L_2 L_3}},$$

where $L_2$ and $L_3$ are the two largest dimensions of a bounding box associated to the respective 3D modeled object. The bounding box may be one that includes the 3D modeled objects, e.g. a minimal size bounding box of a predetermined orientation. Examples are provided later. In case 3D modeled objects contemplated by the method are provided as (at least) CAD data, e.g. as boundary representation (B-Rep format) of respective mechanical parts, these parameters can all be retrieved or computed according to techniques known per se.

Now, by <<corresponds>>, it is meant that small modifications are encompassed in the method. The signature may indeed be exactly or at least substantially equal to an evaluation of the function provided by the above (e.g. error inferior to e.g. 10% or even 5%). Also, the mathematics provided above define the algorithm's framework, but they do need to be implemented as such by the computer (although they can). In other words, the volume, surface, bounding box's dimensions, evaluation of function $f$ can but need not be determined as such (i.e. indirect ways of arriving at the result being encompassed). Notably, other ways of arriving at a substantially same result than the evaluation of function $f$ may be encompassed, in that they would as well provide a good proxy of the thickness. However, the method may comprise at least one evaluation of function $f$ and optionally refine the result from there.

As mentioned earlier, this method allows to query a database of mechanical parts with a criterion related to thickness, providing relevant results thanks to the specific proxy of the thickness being used, in an efficient (fast and memory-economical) manner thanks to the specificities of the contemplated mathematics. Furthermore, the bounding box approach allows relatively high efficiency (relative for example to a ray-casting solution that would suffer from the lack of a priori knowledge on where to optimally cast the rays).

The method is now illustrated with reference to FIGS. 4-31.

The following notions are first discussed: local thickness, average thickness, diameter and thin solid.

Figures 4, 5:
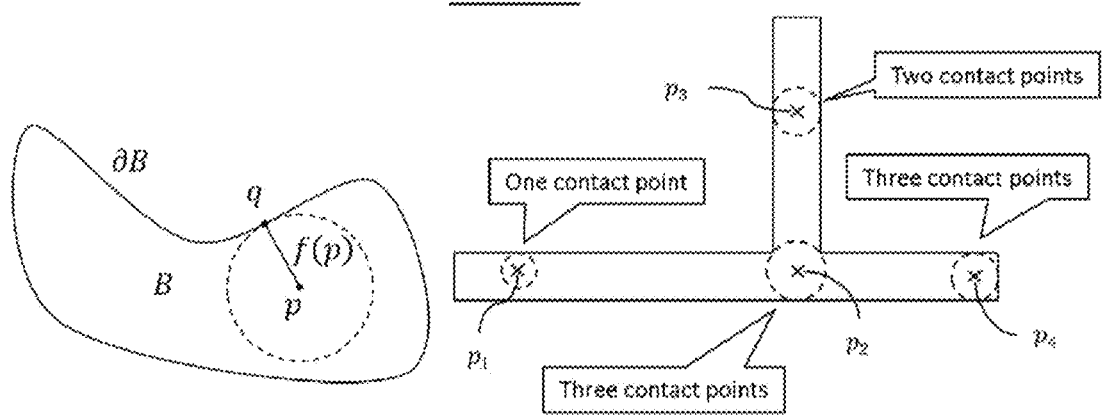
FIGS. 4-31 illustrate the method.

Consider a solid B and its boundary ∂B, as illustrated in FIG. 4. In the context of the method, solid B is the model of a mechanical part so that ∂B is made of regular surfaces (e.g. plane, cylinder, cone, sphere, torus, NURBS). Let a point p∈B and $f(p)$ its smallest distance to the boundary ∂B that is:

$$f(P)=\min\{\|p-q\|, q\in\partial B\}$$

Let K(p) be the set of points q∈∂B such that the smallest distance is satisfied, meaning that:

$$K(p)=\{q\in\partial B, \|p-q\|=f(p)\}$$

Since ∂B is a compact subset of $\mathbb{R}$, K(p) is not empty. Let |K(p)| be the number elements of set K(p). By convention, |K(p)|=∞ if set K(p) is infinite. Geometrically, |K(p)| is the number of contact points between the boundary ∂B of the solid and the sphere of center p with radius $f(p)$, as illustrated in FIG. 5. Clearly, |K($p_1$)|=1, |K($p_3$)|=2 and |K($p_2$)|=|K($p_4$)|=3.

By definition, the medial axis transform of solid B noted Σ(B) is the set of points p∈B such that |K(p)|>1.

$$\Sigma(B)=\{p\in B, |K(p)|>1\}$$

Figure 6:
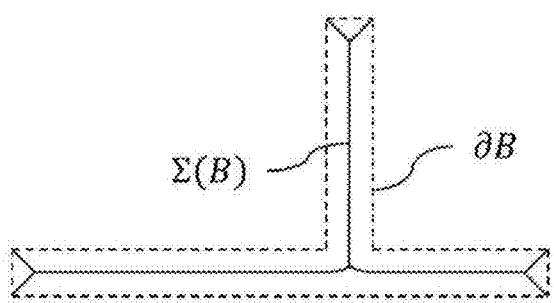
Figure 7:
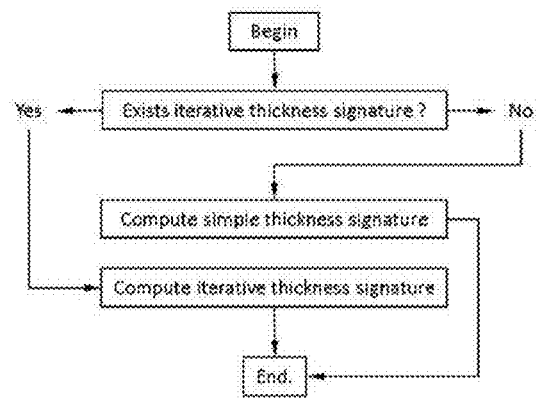

Since ∂B is made of regular surfaces (as mentioned previously) Σ(B) is a set of regular surfaces as well. FIG. 6 illustrates the medial axis transform (solid lines) of a two-dimensional solid (dotted lines). Referring back to FIG. 5, $p_1$ does not belong to Σ(B) as opposed to $p_2$, $p_3$ and $p_4$.

By definition, the average thickness $\bar{t}$(B) of solid B is defined by twice the average value of $f(\cdot)$ over Σ(B). Noting A(Σ(B)) the area of Σ(B)

$$A(\Sigma(B))=\int_{\Sigma(B)} d\sigma$$

The average thickness formula of solid B is $$\bar{t}(B) = \frac{2}{A(\Sigma(B))} \int_{\Sigma(B)} f d\sigma$$

This average thickness real value being too costly to calculate, the method makes use of a proxy: the thickness signature.

By definition, the diameter of solid B is the largest distance separating two points of solid B:

$$\text{Diam}(B)=\max\{\|p-q\|, p\in B, q\in B\}$$

By definition, solid B is a thin solid (such as the thin mechanical parts mentioned later) if the ratio of its average thickness and it diameter is less than 10%:

$$\frac{\bar{t}(X)}{\text{Diam}(X)} \leq 0.1$$

The following discusses two alternatives contemplated by the method for the computation—e.g. at the time of constructing the database or on the fly when executing S2—of a thickness signature value (the "simple thickness signature" on the one hand and the "iterative thickness signature" on the other hand) and describes the overall algorithm to compute the thickness signature. Where the "simple thickness signature" technique always offers an exploitable proxy, the "iterative thickness signature" technique provides a more accurate result (thereby leading to more relevant result), but it is not always defined (i.e. it is not always computable).

Actually, in both cases the thickness signature corresponds to the last result of an iteration of the evaluation of function $f$. The iteration is defined as classical in iterative function evaluation: the evaluation at a given iteration is performed on the result of the previous iteration, starting from $f(0)$. Here again, by "corresponds", it is meant that such iteration of evaluation may be actually implemented (in which case "corresponds" may be replaced by "is equal"), but that mathematical alternatives leading to the same result (exactly or substantially—i.e. error inferior to 10% or 5%) may also be contemplated. Also, it is noted that said iterative process may comprise a unique iterative step. Indeed, where the iteration may be performed until a first fixed point is reached (e.g. in a case where function $f$ has such a fixed point, corresponding to the "iterative thickness signature" mentioned above, for example all such cases—i.e. each time there is a such a fixed point), the iteration may alternatively be stopped after the first iteration (the first iteration being then the last and only one), e.g. when the function has no fixed point. In an example, the method may further comprise a step of determining which alternative to execute, for example based on a predetermined condition, e.g. relative to the existence of a fixed point or not (e.g. first alternative if there is no fixed point, and second alternative if there is one, as mentioned above). In an example, the iteration of function $f$ evaluation is actually performed any way, and it is determined while performing the iteration based on interim results if function $f$ has a fixed point or not, thereby returning to the first value if in the first alternative or continuing or retaining the last result if in the second alternative. This is classical from the field of numerical analysis. The condition may further be relative to additional aspects as well (e.g. expectation of gain of relevance when proceeding to iteration relative to costs thereof). The condition may be evaluated in any way, for example in ways related to later explanations regarding the iterative process. In any case, the iteration may be stopped in any classical way, for example according to a predetermined threshold (such as later-mentioned ε), e.g. indicative that convergence has been obtained.

Thus, in examples of implementation of the method, mechanical parts are modeled by solids, and the searching criterion is designed to capture relevant thickness information of mechanical parts, named the "thickness signature". The method for computing the thickness signature may be two-folded. On one hand, a so called "simple thickness signature" can be computed for any solid. On the other hand, and when it does exist, an "iterative thickness signature" is computed, which is more precise than the simple thickness signature. These general examples are illustrated on FIG. 7.

The simple thickness signature is now discussed.

Figure 8:
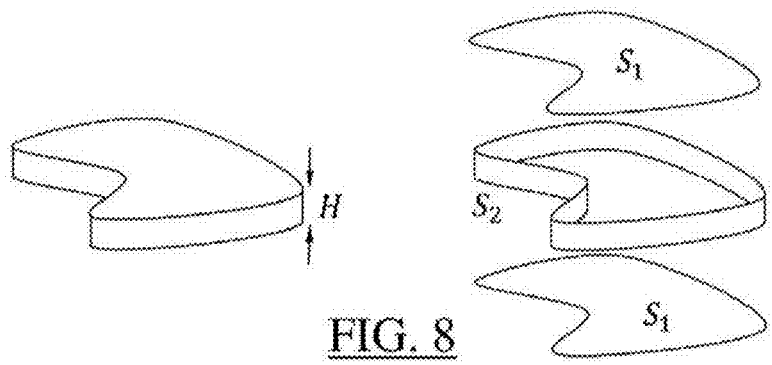

The following establishes a simple example formula of the simple thickness signature, and noted E*, based on the volume and the area of the input solid. Let V be the volume and S the area of this input solid. Suppose that this solid is a prism defined by a small extrusion of a wide basis, as illustrated in FIG. 8. Let $S_1$ be the area of the basis, $S_2$ the area of the side face and H the extrusion height.

Volume V and area S of such an extruded solid are respectively $$V = HS_1$$

$$S = 2S_1 + S_2$$

So:

$$H = \frac{V}{S_1}$$

$$S_1 = \frac{1}{2}(S - S_2)$$

Now, height H is expressed by using V, S, $S_2$.

$$H = \frac{2V}{S - S_2}$$

According to the flat prismatic shape, the side face area $S_2$ is much smaller than the overall area S. Consequently, the approximation $S - S_2 \approx S$ leads to approximate thickness H of the prism by only using volume and area:

$$H \approx \frac{2V}{S}$$

The method defines in examples the simple thickness signature E* by this formula:

$$E^* = \frac{2V}{S}$$

In short, $$H = \frac{2V}{S - S_2} \approx \frac{2V}{S} = E^*.$$

Figure 9:
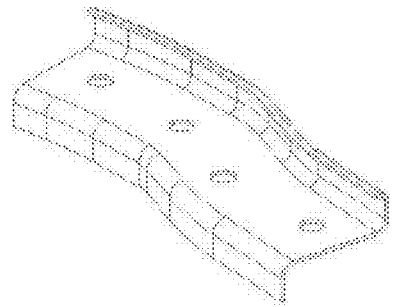

Tests performed on a representative sample of aerospace parts (and reproduced later) show that E* differs from the precise thickness by 1% to 20%. For example, FIG. 9 illustrates a part made of the extrusion of a 3 mm thick profile along a curved trajectory and featuring four through holes. In this example E*=2.901 mm, which is a very good estimation.

It is noted that this formula actually corresponds to the first iteration of the iterative process mentioned earlier and that makes use of the Banach's fixed point theorem (as discussed for example in *On A Version of The Banach's Fixed Point Theorem*, C. O. Imoru, M. O. Olatinwo, G. Akinbo, A. O. Bosede, General Mathematics, Vol. 16, Nr. 1 (2008), 25-32).

The following provides a version of this theorem that is adapted to the scope of the method.

Theorem. Let $f: [a,b] \to [a,b]$ be a contraction mapping, meaning that there exists a real number $0 \leq k < 1$ such that $|f(x) - f(y)| \leq k|x - y|$ for all $x, y \in [a,b]$. Then,
1. there exists a unique number $z \in [a,b]$ such that $z = f(z)$,
2. for any $x_0 \in [a,b]$, the sequence $(x_n)_{n \in N}$ defined by $x_{n+1} = f(x_n)$ converges to z.

The unique number z is called a fixed point of $f(\cdot)$.
The iterative thickness signature can now be discussed.

The example second alternative implements an iterative process converging toward another numerical value, that is an example of the earlier-mentioned so-called "iterative thickness signature" and noted E. In addition to volume V and area S of the input solid, let $L_1 \leq L_2 \leq L_3$ be the edges lengths of the bounding box (mentioned earlier). Said bounding box is advantageously computed with respect to the solid's principal axis system, as detailed later. The principle is to compute E such that the rectangular block defined by edges lengths E, $\lambda L_2$, $\lambda L_3$ features volume V and area S, where $\lambda$ is a new unknown real number.

Nonlinear equations involved is an example of such computation are now discussed.

The system of nonlinear equations is setup as follows. Volume $V_{box}$ and area $S_{box}$ of the bounding box are respectively:

$$V_{box} = L_1 L_2 L_3$$

$$S_{box} = 2(L_2 L_3 + L_1(L_2 + L_3))$$

The nonlinear system involving E and A is obtained by replacing $L_1$ by E, $L_2$ by $\lambda L_2$, $L_3$ by $\lambda L_3$, $V_{box}$ by V and $S_{box}$ by S in the previous formula. This yields:

$$\lambda^2 E L_2 L_3 - V = 0$$

$$\lambda^2 L_2 L_3 + \lambda E(L_2 + L_3) - \frac{S}{2} = 0$$

In an example of the method, the iterative thickness signature E is, by definition, the smallest positive solution of the previous nonlinear system, $\lambda$ being an auxiliary unknown. The following discusses the existence and the number of solutions.

Fixed Point Formulation

The first step is in an example to rewrite the system into a "fixed point" formulation. Unknown $\lambda$ is extracted from the first equation:

$$\lambda = \sqrt{\frac{V}{E L_2 L_3}}$$

So, with the second equation, $$\frac{V}{E} + \sqrt{E}(L_2 + L_3)\sqrt{\frac{V}{L_2 L_3}} - \frac{S}{2} = 0$$

Then, multiplying by E $$V + E^{\frac{3}{2}}(L_2 + L_3)\sqrt{\frac{V}{L_2 L_3}} - \frac{S}{2}E = 0$$

And, finally, $$E = \frac{2}{S}\left(V + E^{\frac{3}{2}}(L_2 + L_3)\sqrt{\frac{V}{L_2 L_3}}\right)$$

Consequently, unknown E is now a fixed point of mapping $f: \mathbb{R}^+ \to \mathbb{R}$ defined by $$f(x) = a\left(b + cx^{\frac{3}{2}}\right)$$

where b=V, $$a = \frac{2}{s} \text{ et } c = (L_2 + L_3)\sqrt{\frac{V}{L_2 L_3}}$$

are positive constants. This means that E is such that E=$f$(E).

Number of Solutions

Mapping $$f(x) = a\left(b + cx^{\frac{3}{2}}\right)$$

is such that:

$$f(0) = ab = \frac{2V}{S}$$

$$f'(x) = \frac{3ac}{2}\sqrt{x}$$

$$f'(0) = 0$$

$$x^{**} = \frac{4}{9a^2 c^2} = \frac{S^2 L_2 L_3}{9V(L_2 + L_3)^2}$$

$$f'(x^{**}) = 1$$

$$f''(x) = \frac{3ac}{4\sqrt{x}}$$

Figure 10:
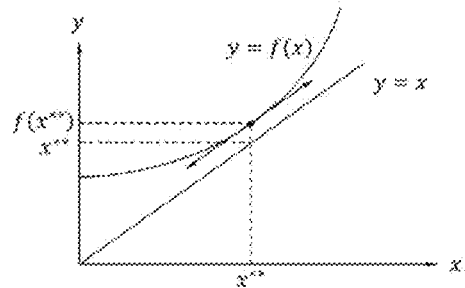
Figure 11:
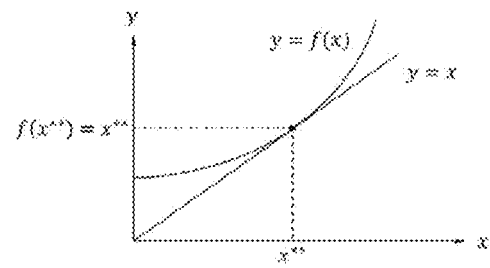
Figure 12:
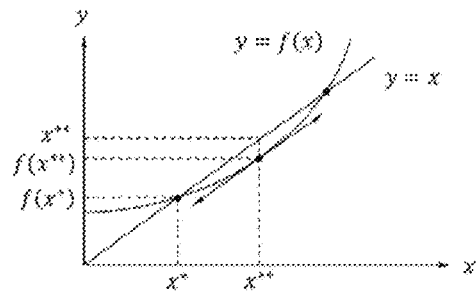
Figure 13:
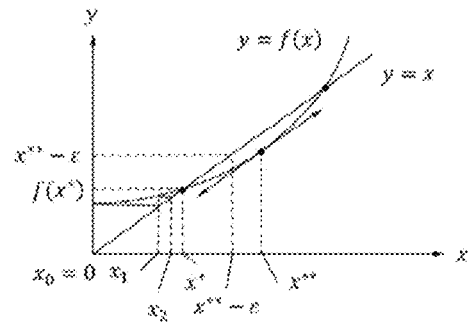

Notice that x is (by definition and notation) the only number such that $f'(x^{})=1$. Furthermore, $f(\cdot)$ is convex because its second derivative $f''(\cdot)$ is strictly positive. By studying variations of mapping g(x)=$f$(x)−x, it is clear that mapping $f(\cdot)$ has no fixed point if $f(x^{})>x^{}$, only one fixed point x if $f(x^{})=x^{}$ and exactly two fixed points if $f(x^{})<x^{}$, as illustrated in FIGS. 10-12**.

Two Solutions Example

The example solid is a bloc defined by edges $L_1$=0.1, $L_2$=0.4, and $L_3$=0.5 and so V=0.02 and S=0.58. There exist two fixed points to mapping $f(\cdot)$. The first one is the actual height of the solid bloc E=0.1. The second fixed point is E≈0.882.

No Solution Example

The example solid is a sphere with radius r. The bounding box is $L_1=L_2=L_3=2r$, $$V = \frac{4}{3}\pi r^3 \text{ and } S = 4\pi r^2,$$

and there is no fixed point to mapping $f(\cdot)$. Indeed, elementary computation leads to $$x^{} = \frac{\pi r}{3} \text{ and } f(x^{}) - x^{**} = \frac{r}{9}(6 - \pi)$$

which is positive with r.

It is noted that the "no solution situation" is relatively rare (statistically) for a database of mechanical parts, if not absent in the case of thin parts (as defined above), in particular in the case of aerospace structural parts which mainly form an assembly of thin parts, such as clips, cleats, stringers, ribs, spars, sections, panels and/or frames, sheet metal parts and/or metal stamping parts, such as automobile body-in-white parts, shipyard industry parts (i.e. ship parts such as stringer panels or folded sheets), plastic molding parts, and composite parts.

Iterative Process Convergence

The iterative process is in an example to compute the sequence $x_{n+1}=f(x_n)$. It is proven that initialization $x_0=0$ provides a sequence $(x_n)_{n \in N}$ converging to the smallest fixed point, when it exists. Indeed, if $f(x^{})<x^{}$, then there exists $\epsilon>0$ such that $f(x^{}-\epsilon) \le x^{}-\epsilon$. This way, noting I=[0,x−ε], mapping $f(\cdot)$ is such that $f(I) \subset I$ because, $f(\cdot)$ being increasing, for all x∈I $$0 < f(0) \le f(x) \le f(x^{}-\epsilon) \le x^{**}-\epsilon$$

In other words, x∈I ⇒$f$(x)∈I. Furthermore, for all x∈I, $$|f'(x)| \le \max_{x \in I}|f'(x)| = |f'(x^{**} - \epsilon)| < 1$$

which makes $f(\cdot)$ a contraction from I to I, parameter k of the theorem being k=|$f'$(x−ε)|. So, according to the fixed point theorem, there exists a unique fixed point of $f(\cdot)$ in interval I and the iterative process $x_{n+1}=f(x_n)$ converges toward this fixed point for any initialization $x_0 \in I$. This is illustrated on FIG. 13**.

An example of a robust algorithm for computing the thickness signature is now discussed.

The inputs of the algorithm are V, S, $L_2$, $L_3$ respectively the volume, the area and the largest edges of the bounding box of the input solid. Integer n is the predefined number of fixed point iterations. The output X of the algorithm is either the simple thickness signature E* or the iterative thickness signature E depending on the existence of fixed point(s) of mapping $f(\cdot)$. The algorithm always yields the best possible result:

$$x^{**} := \frac{S^2 L_2 L_3}{9V(L_2 + L_3)^2}$$

```
If f(x**) < x** then
    x := f(0)
    For i := 1 to n do begin
        x := f(x)
    End for
    X := x
Else if f(x**) = x** then
    X := x**
Else
```

$$X := \frac{2V}{S}$$

End if

The previous implementation is very efficient in most cases. Nevertheless, when $f(x^{})<x^{}$ and $f(x^{})$ is close to x the convergence slows down. The algorithm may compute an inaccurate result in an "easy" case. To avoid this drawback, an alternative to the "for" loop is to stop iterations when |x−$f$(x)| is smaller than a predefined numerical threshold ε, typically: $\varepsilon=10^{-12}$. More precisely, the above "for" loop can be replaced by the following "repeat-until" loop.

```
i := 0
    Repeat
        i := i + 1
        y := x
        x := f (x)
    Until i ≥ n or |y − x| < ε
```

An example of iterative thickness signature computation is now discussed.

Figure 14:
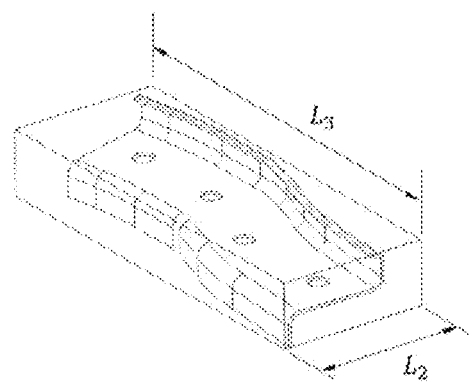

FIG. 14 illustrates the input solid together with its bounding box. Volume V of the solid, area S of the solid and edges lengths $L_2$, $L_3$ of its bounding box are the inputs of the algorithm.

Since $f(x^{})<x^{}$ in this example, the iterative thickness signature can be computed, and the starting value for iterations is $$E^* = \frac{2V}{S} = 2.901 \text{ mm},$$

which estimates the actual 3 mm thickness value by 3.3%. Remember that the actual thickness value is known in the example, but is unknown in real life.

Figure 15:
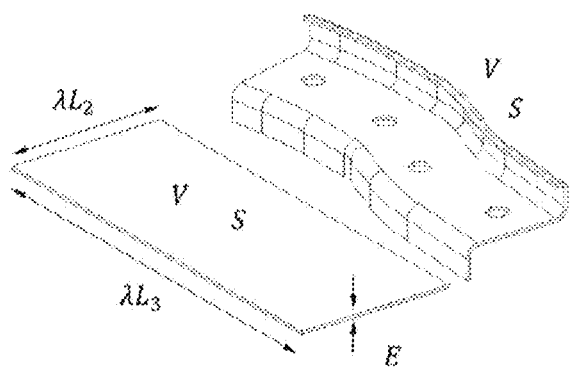

The computed iterative thickness signature is E=2.98 mm, which is better than the initial guess and close to the precise thickness by 0.7%. FIG. 15 illustrates the input solid together with the rescaled bounding box. Edges lengths of the box are E, $\lambda L_2, \lambda L_3$ where $\lambda=1.0165$, and, by construction, its volume and area are those of the input solid: V and S.

As mentioned earlier, the bounding box may be one whose axis are substantially those of the inertia matrix. For example, the bounding box has axes defined by the inertia matrix of the respective 3D modeled object. The method indeed corresponds to intuitively crushing a bounding box on the mechanical part to a limit and to evaluate the thickness signature value as the thickness of the thereby "crushed" bounding box. The above specific axis directions allow an initial bounding box and a crushing to be oriented "correctly", so as to provide a relatively accurate result.

Although known as such in the art, the principal axis system of inertia concept is now discussed.

Consider a solid B, made of homogeneous material, so that its volumetric mass density is not involved in the following formulas and can be ignored. The center of gravity $g=(x_G, y_G, z_G)$ of solid B is computed according to:

$$x_G = \frac{1}{V} \iiint_B x \, dv$$

$$y_G = \frac{1}{V} \iiint_B y \, dv$$

$$z_G = \frac{1}{V} \iiint_B z \, dv$$

Where V is the volume of B:

$V = \iiint_B dv$

Suppose now that solid B is translated so that its center of gravity is the origin of the canonical axis system. The matrix of inertia I of solid B with respect to the canonical axis system is defined by:

$$I = \begin{pmatrix} I_x & -I_{xy} & -I_{xz} \\ I_{xy} & I_y & -I_{yz} \\ -I_{xz} & -I_{yz} & I_z \end{pmatrix}$$

where:

$$I_x = \iiint_B (y^2 + z^2) dv$$

$$I_y = \iiint_B (x^2 + z^2) dv$$

$$I_z = \iiint_B (y^2 + z^2) dv$$

And:

$$I_{xy} = \iiint_B xy \, dv$$

$$I_{yz} = \iiint_B yz \, dv$$

$$I_{xz} = \iiint_B xz \, dv$$

Figure 16:
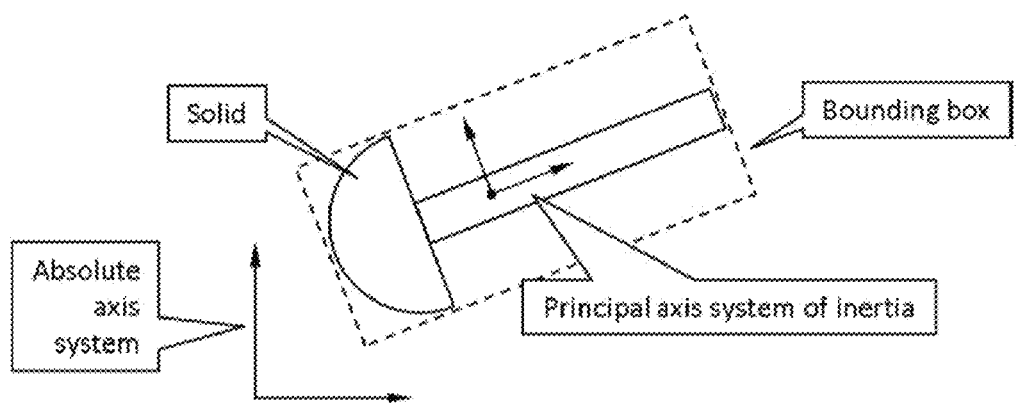

The principal axis of inertia are the eigenvectors $v_1$, $v_2$ and $v_3$ of matrix I, meaning that $Iv_i = \lambda_i v_i$ where $\lambda_i$ are the respective eigenvalues of $v_i$ and are named the principal moments of inertia. Since matrix I is symmetric, vectors $v_i$ are mutually perpendicular. Finally, the principal axis system of inertia is defined by the center of gravity g and vectors $v_1$, $v_2$ and $v_3$. FIG. 16 illustrates a solid and its bounding box computed according to its principal axis system of inertia (e.g. to be set relative to an absolute axis system).

Now, as mentioned above, the method applies particularly well where the database contains (at least mostly, e.g. for above 80% of the modeled objects of the database) thin parts ("thin" being as defined earlier). Indeed, in such a case thickness search is particularly useful to the user, because thickness is discriminating, for example combined with other dimensions of earched part(s) such as the diameter. This is the case for databases used in aerospace/aeronautics projects. Indeed, for mechanical parts in such databases, mass is crippling, such that parts are most often thin. In such conditions, thickness becomes a very significant characteristic for database search. This holds true for automobile body-in-white, shipyard industry parts or composite parts as well. In an example, the database contains more than a hundred (preferably more than a thousand or even ten thousand) mechanical parts, and for at least 80% of the parts the real thickness (average) value is between 1 mm and 20 mm while the diameter is at least ten times the thickness (thus between 1 cm and 20 cm), preferably higher than 5 cm. Such parts may be as any of the examples provided in the following, which thus can all or in combinations be part of the database.

Figure 17:
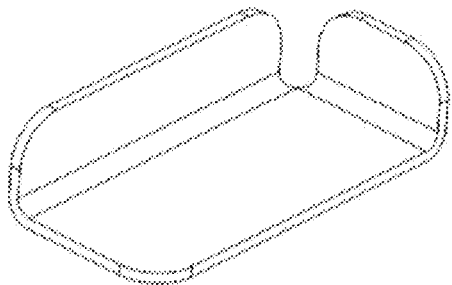
Figure 18:
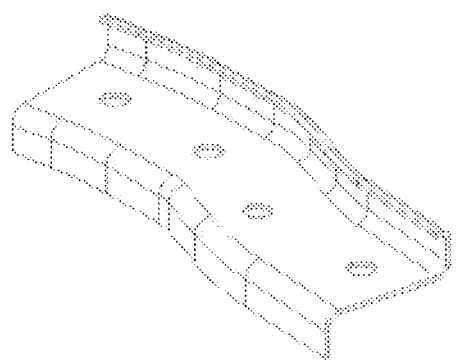
Figure 19:
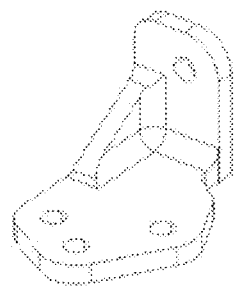
Figure 20:
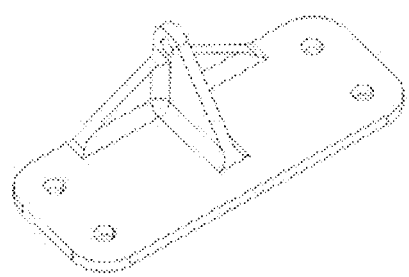
Figure 21:
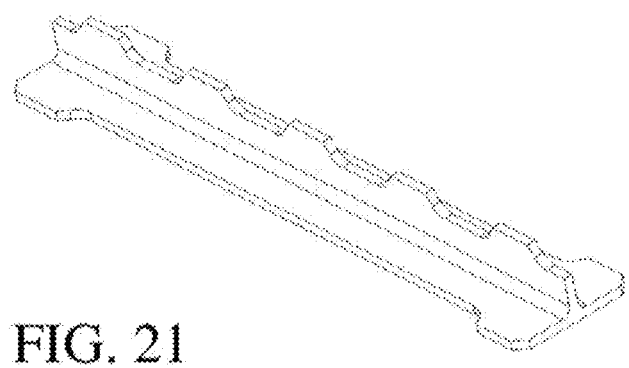
Figure 22:
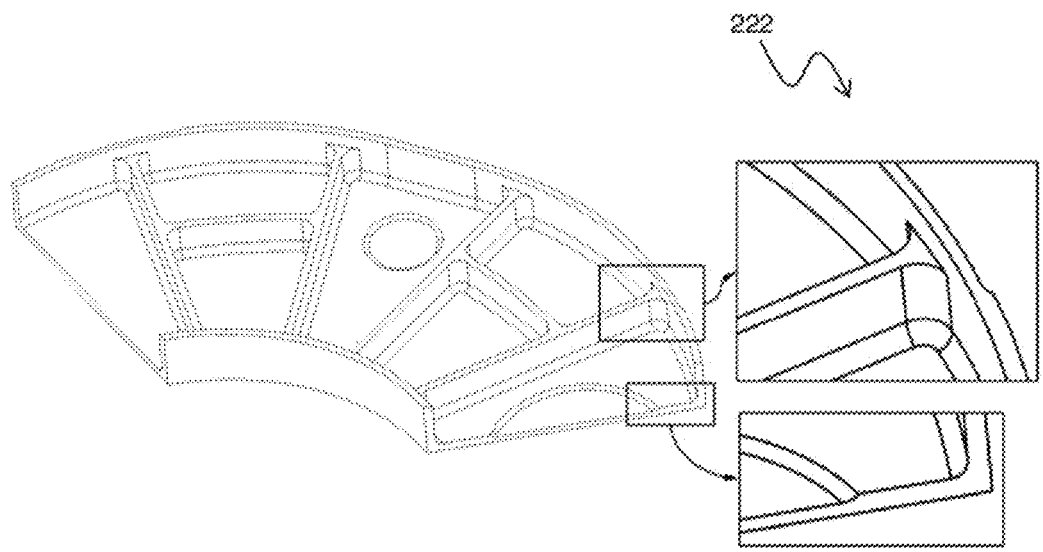

The thickness signature defined by the method turns out to be very efficient when searching aerospace structural part: clips, cleats, stringers, frames. FIGS. 17-18 illustrate typical aerospace clips. FIGS. 19-20 illustrate typical aerospace cleats. FIG. 21 illustrates a typical aerospace stringer. FIG. 22 illustrates a typical aerospace frame. Notice that this part features a non-constant thickness (that the method allows to take into account), as illustrated by local magnifications 222.

Figure 23:
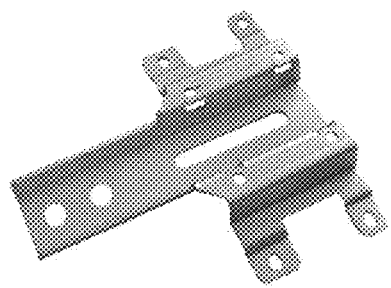
Figure 24:
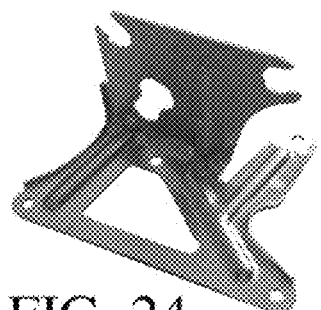
Figure 25:
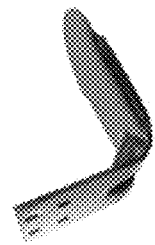
Figure 26:
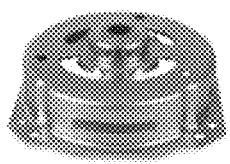
Figure 27:
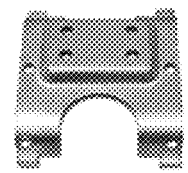
Figure 28:
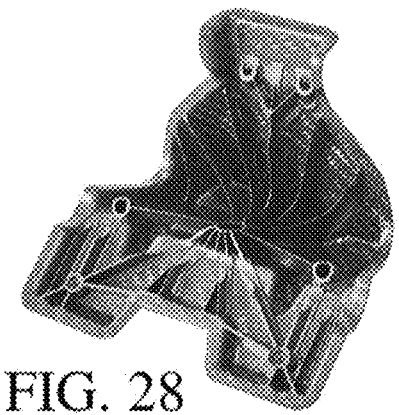
Figure 29:
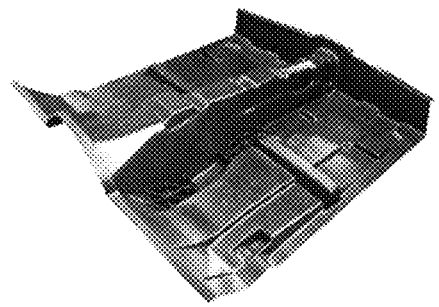
Figure 30:
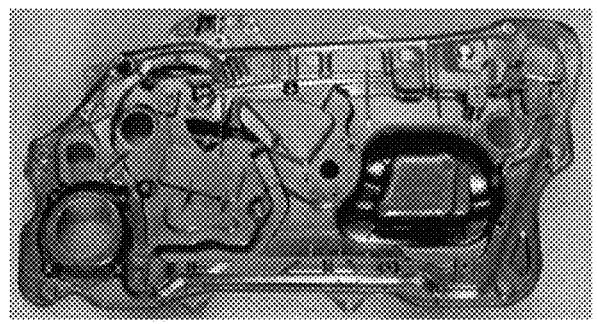
Figure 31:
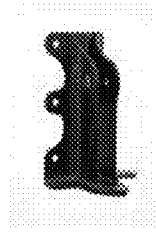

The method is also efficient when searching sheet metal parts as well as metal stamping parts, for any industry, including body-in-white parts for the automotive industry, or shipyard industry parts. The method is efficient as well for searching plastic molding parts for any industry, including consumer goods, automotive and aerospace. FIGS. 23-24 show photos of typical sheet metal parts. FIGS. 25-27 show photos of typical metal stamping parts for automotive industry.

Finally, the method is efficient when searching composites parts for aerospace and automotive industry, as illustrated on the photos shown on FIGS. 28-31.

The following details an example of the thickness signature computation on test parts.

Tests performed with a representative sample of industrial parts proved that the thickness signature is an efficient tool for database search. Table I gathers measurements and computations on a sample of constant thickness clips. Table II gathers measurements and computations on a sample of constant thickness cleats and a constant thickness frame part. Table III gathers measurements and computations on a sample of frame parts. These parts feature non-constant thickness (which is no issue for the method, compared to a very costly if not impossible exact evaluation of the real thickness).

TABLE I

Measurements and computations on a sample of constant thickness clips

| Length unit: mm | Clip 1 | Clip 2 | Clip 3 | Clip 4 | Clip 5 | Clip 6 |
|---|---|---|---|---|---|---|
| Part volume: V | 92004.90 | 58714.60 | 59371.70 | 104472.00 | 48802.50 | 67958.60 |
| Part area: S | 56921.80 | 36375.90 | 44209.10 | 87485.60 | 40820.50 | 42660.90 |
| Simple thickness: $E^* = \frac{2V}{S}$ | 3.233 | 3.228 | 2.686 | 2.388 | 2.391 | 3.186 |
| Box size: $L_1$ | 55.733 | 55.731 | 54.882 | 55.068 | 55.892 | 63.418 |
| Box size: $L_2$ | 132.826 | 125.375 | 129.115 | 134.190 | 157.657 | 126.357 |
| Box size: $L_3$ | 234.120 | 127.778 | 155.517 | 379.619 | 194.743 | 151.699 |
| Iterative thickness: E | 3.370 | 3.395 | 2.789 | 2.453 | 2.476 | 3.336 |
| Actual thickness: t | 3.410 | 3.410 | 2.790 | 2.480 | 2.480 | 3.410 |
| Simple thickness error: $\frac{E^* - t}{t}$ | −5.20% | −5.33% | −3.73% | −3.70% | −3.59% | −6.57% |
| Iterative thickness error: $\frac{E - t}{t}$ | −1.18% | −0.44% | −0.03% | −1.09% | −0.17% | −2.18% |

TABLE II

Measurements and computations on a sample of constant thickness cleats and a constant thickness frame part

| Length unit: mm | Cleat 1 | Cleat 2 | Cleat 3 | Cleat 4 | Frame 1 |
|---|---|---|---|---|---|
| Part volume: V | 30714.100 | 163395.000 | 44246.600 | 32649.100 | 8.65E+05 |
| Part area: S | 15724.300 | 65774.200 | 22784.200 | 13600.200 | 875220 |
| Simple thickness: $E^* = \frac{2V}{S}$ | 3.907 | 4.968 | 3.884 | 4.801 | 1.976 |
| Box size: $L_1$ | 69.107 | 106.369 | 36.300 | 56.000 | 67.776 |
| Box size: $L_2$ | 78.412 | 133.614 | 59.779 | 61.214 | 698.636 |
| Box size: $L_3$ | 89.875 | 165.028 | 132.062 | 89.060 | 2358.880 |
| Iterative thickness: E | 4.306 | 5.267 | 4.231 | 5.499 | 1.990 |
| Actual thickness: t | 4.200 | 5.000 | 4.000 | 5.500 | 2.000 |
| Simple thickness error: $\frac{E^* - t}{t}$ | −6.99% | −0.63% | −2.90% | −12.70% | −1.22% |
| Iterative thickness error: $\frac{E - t}{t}$ | 2.52% | 5.34% | 5.77% | −0.03% | −0.50% |

TABLE III

Measurements and computations on a sample of frames parts

| Length unit: mm | Frame 2 | Frame 3 | Frame 4 | Stringer 1 | Stringer 2 |
|---|---|---|---|---|---|
| Part volume: V | 2.47E+06 | 1.22E+07 | 902696 | 3.42E+06 | 1.56E+07 |
| Part area: S | 9.90E+05 | 3.84E+06 | 816318 | 885614 | 3.92E+06 |
| Simple thickness: $E^* = \frac{2V}{S}$ | 4.991 | 6.330 | 2.212 | 7.724 | 7.943 |

TABLE III-continued

Measurements and computations on a sample of frames parts

| Length unit: mm | Frame 2 | Frame 3 | Frame 4 | Stringer 1 | Stringer 2 |
|---|---|---|---|---|---|
| Box size: $L_1$ | 71.605 | 203.709 | 65.594 | 138.171 | 210.733 |
| Box size: $L_2$ | 778.699 | 586.928 | 1280.640 | 1426.330 | 5363.990 |
| Box size: $L_3$ | 1872.720 | 2784.990 | 2671.520 | 2119.480 | 8994.110 |
| Iterative thickness: E | 5.071 | 6.408 | 2.228 | 7.914 | 8.037 |
| Actual thickness: t | 3.4 to 10 | 3 to 8 | 1.8 to 3.6 | 6 to 11 | 5.9 to 11.7 |

While this invention has been particularly shown and described with references to example embodiments thereof, it will be understood by those skilled in the art that various changes in form and details may be made therein without departing from the scope of the invention encompassed by the appended claims.

The invention claimed is:

1. A computer-implemented method for querying a database, the method comprising:

running a query on a database, the database comprising 3D modeled objects that represent mechanical parts, the query including a thickness criterion, and the running being performed by a processor;

returning by the processor, as results of the query, respective 3D modeled objects of the database, the processor returning from the database a respective 3D modeled object based on an extent to which the respective 3D modeled object has a thickness that meets the thickness criterion of the query, wherein:

the respective 3D modeled object has a volume V and a surface S, the thickness of the respective 3D modeled object is proxied in the database by a thickness signature of the respective 3D modeled object, such that the processor returns the respective 3D modeled object in the results of the query based on comparing (a) the thickness signature of the respective 3D modeled object to (b) the thickness criterion of the query, and the thickness signature is a value that corresponds to an evaluation of a function $f$ of type $$f(x) = a\left(b + cx^{\frac{3}{2}}\right),$$

where:

b is the volume V of the respective 3D modeled object, a=2/S where S is the surface of the respective 3D modeled object, $$c = (L_2 + L_3)\sqrt{\frac{V}{L_2 L_3}},$$

L2 and L3 are two largest dimensions of a bounding box associated to the respective 3D modeled object.

2. The method of claim 1, wherein the evaluation of the function $f$ includes one or more iterations of the function $f$ starting from $f(0)$, where when the evaluation includes more than one iteration of the function $f$, the function $f$ uses a result of a previous iteration ; and wherein the thickness signature corresponds to a result of a last iteration of the one or more iterations.

3. The method of claim 2, wherein the one or more iterations comprises at least a first iteration, and one or both of: (i) the one or more iterations is stopped after the first iteration when the function $f$ has no fixed point, and (ii) the one or more iterations continues until a first fixed point is reached.

4. The method of claim 1, wherein the bounding box has axes defined by an inertia matrix of the respective 3D modeled object.

5. The method of claim 1, wherein the mechanical parts include mechanical thin parts.

6. The method of claim 5, wherein the mechanical parts include any or several of:

aerospace structural parts, including one or more of: clips, cleats, stringers and/or frames;

at least one of: sheet metal parts and metal stamping parts, including one or more of: automobile body-in-white parts or ship parts;

plastic molding parts; and composite parts.

7. A data storage and retrieval system for 3D modeled objects, the system comprising:

a non-transitory computer readable storage medium having a database recorded thereon; and a processor coupled to the computer readable storage medium, the processor programmed to configure the database with 3D modeled objects that represent mechanical parts, each respective 3D modeled object of the database having a volume V and a surface S, wherein each respective 3D modeled object of the database is associated to a thickness signature of the respective 3D modeled object, and the thickness signature of a respective 3D modeled object is a value that corresponds to an evaluation of a function $f$ of type $$f(x) = a\left(b + cx^{\frac{3}{2}}\right),$$

where:

b is the volume V of the respective 3D modeled object, a=2/S where S is the surface of the respective 3D modeled object, $$c = (L_2 + L_3)\sqrt{\frac{V}{L_2 L_3}},$$

L2 and L3 are two largest dimensions of a bounding box associated to the respective 3D modeled object.

8. A computer-implemented method for constructing a database, the method comprising:

adding to a database recorded on a non-transitory computer readable storage medium, 3D modeled objects that represent mechanical parts, each respective 3D modeled object having a volume V and a surface S, the adding being performed by a processor; and associating by the processor, each respective 3D modeled object of the database to a thickness signature of the respective 3D modeled object, wherein the thickness signature of a respective 3D modeled object is a value that corresponds to an evaluation of a function $f$ of type $$f(x) = a\left(b + cx^{\frac{3}{2}}\right),$$

where:

b is the volume V of the respective 3D modeled object,
a=2/S where S is the surface of the respective 3D modeled object, $$c = (L_2 + L_3)\sqrt{\frac{V}{L_2 L_3}},$$

L2 and L3 are two largest dimensions of a bounding box associated to the respective 3D modeled object, the associating for the respective 3D modeled object including at least one evaluation of the function $f$.

9. The method of claim 8, wherein the evaluation of the function $f$ includes one or more iterations of the function $f$, starting from $f(0)$, where when the evaluation includes more than one iteration of the function $f$, the function $f$ uses a result of a previous iteration.

10. The method of claim 9, wherein the one or more iterations comprises at least a first iteration, and one or both of: (i) the one or more iterations is stopped after the first iteration when the function $f$ has no fixed point, and (ii) the one or more iterations continues until a first fixed point is reached.

11. A computer program product comprising:

a non-transitory computer-readable storage medium having code instructions stored thereon, the storage medium operatively coupled to a processor, such that when executed by the processor for querying a database, the code instructions cause the processor to:

run a query on the database, the database comprising 3D modeled objects that represent mechanical parts, the query including a thickness criterion; and return, as results of the query, respective 3D modeled objects of the database, the processor returning from the database a respective 3D modeled object based on an extent to which the respective 3D modeled object has a thickness that meets the thickness criterion of the query, wherein:

the respective 3D modeled object has a volume V and a surface S, the thickness of the respective 3D modeled object is proxied in the database by a thickness signature of the respective 3D modeled object, such that the processor returns the respective 3D modeled object in the results of the query based on comparing (a) the thickness signature of the respective 3D modeled object to (b) the thickness criterion of the query, and the thickness signature is a value that corresponds to an evaluation of a function of the type $$f(x) = a\left(b + cx^{\frac{3}{2}}\right),$$

where:

b is the volume V of the respective 3D modeled object,
a=2/S where S is the surface of the respective 3D modeled object, $$c = (L_2 + L_3)\sqrt{\frac{V}{L_2 L_3}},$$

L2 and L3 are two largest dimensions of a bounding box associated to the respective 3D modeled object.

12. A computer system for querying a database, the system comprising:

a processor; and memory operatively coupled to the processor, the memory having recorded thereon code instructions, such that when executed by the processor, the computer code instructions cause the system to:

run a query on a database configured in the memory, the database comprising 3D modeled objects that represent mechanical parts, the query including a thickness criterion; and return, as results of the query, respective 3D modeled objects of the database, the processor returning a respective 3D modeled object based on an extent to which the respective 3D modeled object has a thickness that meets the thickness criterion of the query, wherein:

the respective 3D modeled object has a volume V and a surface S, the thickness of the respective 3D modeled object is proxied in the database by a thickness signature of the respective 3D modeled object, such that the processor returns the respective 3D modeled object in the results of the query based on comparing (a) the thickness signature of the respective 3D modeled object to (b) the thickness criterion of the query, and the thickness signature is a value that corresponds to an evaluation of a function $f$ of type $$f(x) = a\left(b + cx^{\frac{3}{2}}\right),$$

where:

b is the volume V of the respective 3D modeled object,
a=2/S where S is the surface of the respective 3D modeled object, $$c = (L_2 + L_3)\sqrt{\frac{V}{L_2 L_3}},$$

L2 and L3 are two largest dimensions of a bounding box associated to the respective 3D modeled object.

13. A computer program product comprising:

a non-transitory computer-readable storage medium having code instructions stored thereon, the storage medium operatively coupled to a processor, such that when executed by the processor for constructing a database, the code instructions cause the processor to:

add to the database recorded on the storage medium, 3D modeled objects that represent mechanical parts, each respective 3D modeled object having a volume V and a surface S; and associate each respective 3D modeled object of the database to a thickness signature of the respective 3D modeled object, wherein the thickness signature of a respective 3D modeled object is a value that corresponds to an evaluation of a function $f$ of the type $$f(x) = a\left(b + cx^{\frac{3}{2}}\right),$$

where:
b is the volume V of the respective 3D modeled object,
a=2/S where S is the surface of the respective 3D modeled object, $$c = (L_2 + L_3)\sqrt{\frac{V}{L_2 L_3}},$$

L2 and L3 are two largest dimensions of a bounding box associated to the respective 3D modeled object,
the associating for the respective 3D modeled object including at least one evaluation of the function $f$.

* * * * *